United States Patent
Hirano et al.

(10) Patent No.: US 9,141,219 B2
(45) Date of Patent: Sep. 22, 2015

(54) OPERATING DEVICE FOR PROVIDING TACTILE FEEDBACK ON A DEPRESSIBLE TOUCH SCREEN

(71) Applicant: KABUSHIKI KAISHA TOKAI RIKA DENKI SEISAKUSHO, Aichi (JP)

(72) Inventors: Yoshihisa Hirano, Aichi (JP); Hiroshi Ueno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/390,280

(22) PCT Filed: Mar. 22, 2013

(86) PCT No.: PCT/JP2013/058300
§ 371 (c)(1),
(2) Date: Oct. 2, 2014

(87) PCT Pub. No.: WO2013/153934
PCT Pub. Date: Oct. 17, 2013

(65) Prior Publication Data
US 2015/0077360 A1    Mar. 19, 2015

(30) Foreign Application Priority Data
Apr. 12, 2012 (JP) .................. 2012-090851

(51) Int. Cl.
*G06F 3/01* (2006.01)
*G06F 3/0354* (2013.01)
(Continued)

(52) U.S. Cl.
CPC *G06F 3/041* (2013.01); *G06F 3/01* (2013.01); *G06F 3/016* (2013.01); *G06F 3/0354* (2013.01); *H01H 2003/0293* (2013.01)

(58) Field of Classification Search
CPC .................. G06F 3/041–3/047; G06F 3/0354; G06F 2203/04102; G06F 2203/014; G06F 2203/04105; G06F 3/016
See application file for complete search history.

(56) References Cited

U.S. PATENT DOCUMENTS

2010/0039393 A1*   2/2010   Pratt et al. ............. 345/173
2010/0156818 A1*   6/2010   Burrough et al. ....... 345/173
2012/0154315 A1    6/2012   Aono

FOREIGN PATENT DOCUMENTS

JP    S631988-164127 U    10/1988
JP    07-325653 A         12/1995
(Continued)

OTHER PUBLICATIONS

International Preliminary Report on Patentability PCT/JP2013/058300 dated Oct. 14, 2014.
(Continued)

*Primary Examiner* — Larry Sternbane
(74) *Attorney, Agent, or Firm* — Roberts Mlotkowski Safran & Cole P.C.

(57) ABSTRACT

Provided is an operating device with which the erroneous detection of depression operations can be prevented when tactile sensation is presented, without requiring a sophisticated control. This operating device (1) substantially includes a touch panel (2) that detects tracing on an operation screen; a depression mechanism unit (3) capable of a depression operation in the direction downward from a standard position of the touch panel (2) a push switch (5) that detects a depression operation via the depression mechanism (3), and a drive mechanism unit (7) capable of driving between the standard position of the touch panel (2) and a position thereabove.

6 Claims, 9 Drawing Sheets

(51) Int. Cl.
*G06F 3/041* (2006.01)
*H01H 3/02* (2006.01)

(56) References Cited

FOREIGN PATENT DOCUMENTS

| JP | 2005-216110 A | 8/2005 |
| JP | 2008-016053 A | 1/2008 |
| JP | 2011-048606 | 3/2011 |
| JP | 2011-210283 | 10/2011 |
| JP | 5173044 | 3/2013 |

OTHER PUBLICATIONS

International Search Report PCT/JP2013/058300 dated May 14, 2013.

Notification of reasons for refusal dated Oct. 2, 2014 issued in JP5173044 (JP2012-090851) a copy of the office action, patented claims and English translation thereof is available via AIPN dossier access system.

* cited by examiner

OPERATING DEVICE FOR PROVIDING TACTILE FEEDBACK ON A DEPRESSIBLE TOUCH SCREEN

TECHNICAL FIELD

The embodiment of the present invention relates to an operating device.

BACKGROUND ART

As a conventional technique, an input device is known which is provided with a touch sensor for detecting a sliding operation, a tactile presentation portion for vibrating the touch sensor to provide tactile sensation and a load sensing portion sensing a load applied to the touch sensor and thereby detecting a push operation performed on the touch sensor (see, e.g., PTL 1).

This input device can provide a tactile feedback to a user according to sliding and push operations performed on the touch sensor by the user.

CITATION LIST

Patent Literature

[PTL 1]
JP-A-2011-048606

SUMMARY OF INVENTION

Technical Problem

In the conventional input device, however, when tactile sensation is provided by vibration, the vibration may be applied to the load sensing portion via the touch sensor and may be misdetected as a load of push operation even though the push operation is not performed. Thus, a sophisticated control such as inactivating the load sensing portion is required to prevent the misdetection.

It is an object of the invention to provide an operating device that can prevent the erroneous detection of depression operations when tactile sensation is presented without requiring the sophisticated control.

Solution to Problem

According to one embodiment of the invention, an operating device comprises:
   a detecting portion driven between a standard position and a drive position above the standard position when a predetermined operation of tracing on an operation screen by a user is detected;
   a depression mechanism unit to allow a depression operation by a user in a direction downward from the standard position of the detecting portion;
   a depression detecting portion to detect the depression operation via the depression mechanism unit; and
   a drive mechanism unit to allow the driving of the detecting portion.

Advantageous Effects of Invention

According to one embodiment of the invention, an operating device can prevent the erroneous detection of depression operations when tactile sensation is presented without requiring the sophisticated control.

DESCRIPTION OF EMBODIMENTS

Summary of the Embodiments

An operating device in the embodiment is provided with a detecting portion driven between a standard position and a drive position above the standard position when a predetermined operation of tracing on an operation screen by a user is detected, a depression mechanism unit to allow a depression operation by a user in a direction downward from the standard position of the detecting portion, a depression detecting portion to detect the depression operation via the depression mechanism unit, and a drive mechanism unit to allow the driving of the detecting portion.

Embodiments (Configuration of Operating Device 1)

Figure 1:
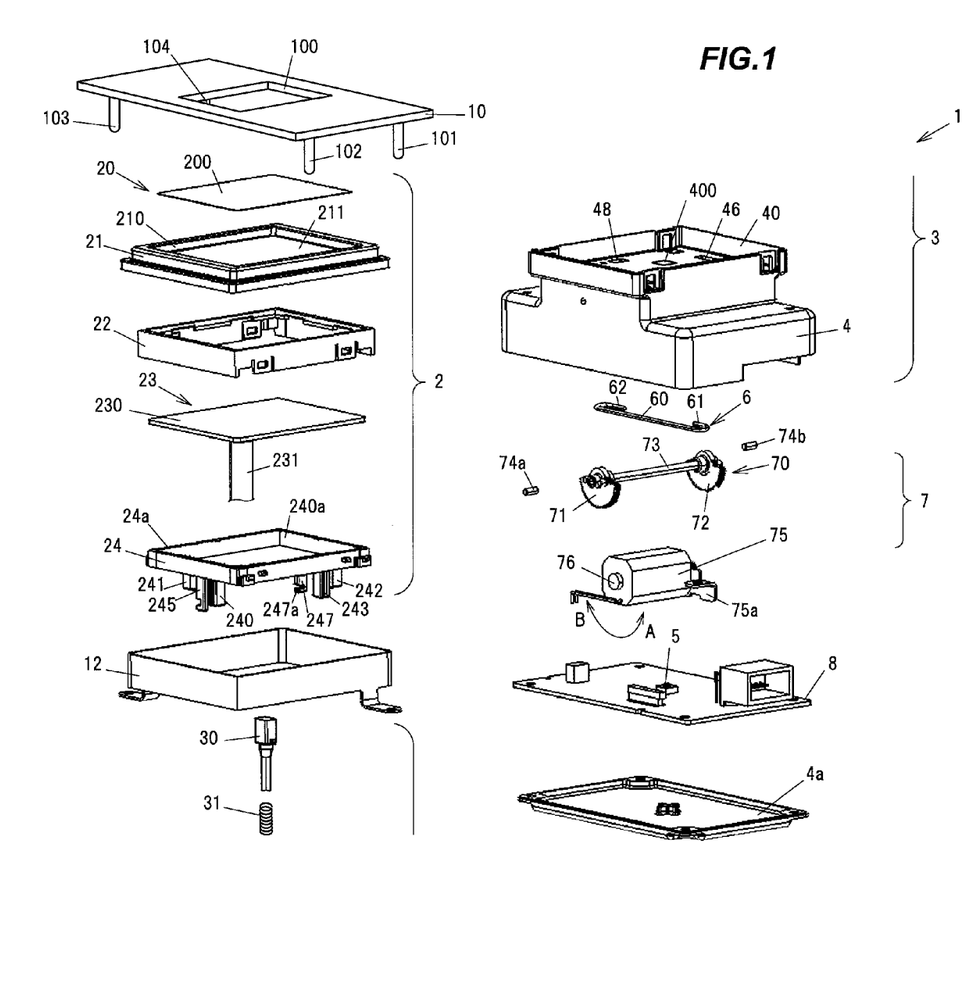
FIG. 1 is an exploded perspective view showing an operating device in an embodiment.
Figure 2A:
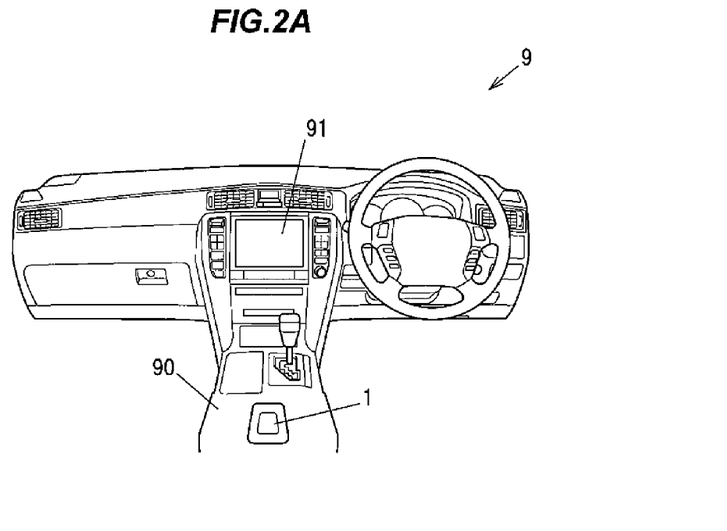
FIG. 2A is an explanatory schematic view showing a position of the operating device in the embodiment and FIG. 2B is a block diagram illustrating the operating device.
Figure 2B:
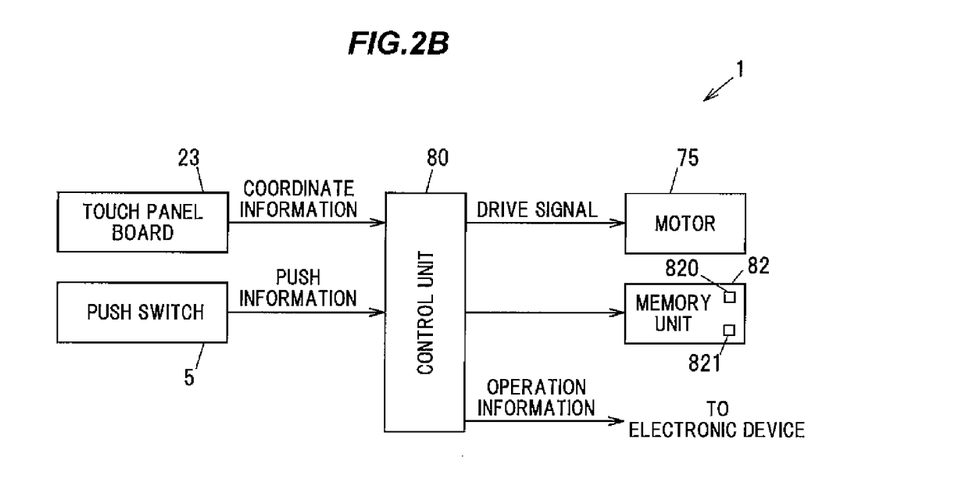

FIG. 1 is an exploded perspective view showing an operating device in the embodiment. FIG. 2A is an explanatory schematic view showing a position of the operating device in the embodiment and FIG. 2B is a block diagram illustrating the operating device. It should be noted that "upward/upper" and "downward/lower" described hereinafter are based on the upper and lower sides of the paper surface of FIG. 1 unless otherwise stated. In addition, a component-to-component ratio is sometimes different from the actual ratio in each drawing of the embodiment.

The operating device 1 is generally composed mainly of a touch panel 2 as the detecting portion which detects an operation of tracing on an operation screen, a depression mechanism unit 3 capable of a depression operation in the direction downward from a standard position of the touch panel 2, a push switch 5 as the depression detecting portion which detects a depression operation via the depression mechanism unit 3, and a drive mechanism unit 7 capable of driving the touch panel 2 between the standard position and a position thereabove.

Here, the standard position means a position of the touch panel 2 in the state that the touch panel 2 is not operated.

The operating device 1 is also provided with a cover 4a, a bezel 10, a shield 12, a stabilizer 6 and a control board 8, as shown in FIG. 1.

The operating device 1 is adapted to operate electronic devices mounted on a vehicle 9. As shown in FIG. 2A, the operating device 1 is arranged on a center console 90 located between a driver seat and a front passenger seat. The electronic devices are, e.g., a car navigation system, a music player, a video player and an air conditioner, etc.

(Configuration of Bezel 10)

As shown in FIGS. 1 and 2A, the operating device 1 is provided with the bezel 10 so as to be level with the surface of the center console 90. The bezel 10 is formed in a plate shape having an opening 100 from which an operation screen 200 of the touch panel 2 is exposed. The bezel 10 is formed of, e.g., a resin material.

As shown in FIG. 1, the bezel 10 is provided with legs 101 to 104 protruding from the back surface at four corners. The legs 101 to 104 are adapted to be attached to a body 4 which is described later.

(Configuration of Touch Panel 2)

The touch panel 2 is generally composed of, e.g., a sheet 20, a mask rubber 21, panel 22, a touch panel board 23 and a base 24, as shown in FIG. 1.

The sheet 20 is attached to a bottom surface 211 of a recessed portion 210 of the mask rubber 21 so that sliding of, e.g., a finger of an operator is improved. The sheet 20 is formed of a resin material and formed in a rectangular shape. The operator performs an operation on the surface of the sheet 20 (on the operation screen 200) and the touch panel board 23 detects the operation.

The mask rubber 21 is formed of, e.g., a resin material such as elastomer resin. The mask rubber 21 has a rectangular shape with a stepped portion provided around the periphery thereof. In addition, the recessed portion 210 is provided in the middle of the mask rubber 21. The mask rubber 21 is arranged on the touch panel board 23.

The panel 22 is, e.g., a rectangular frame which integrates the mask rubber 21, the touch panel board 23 and the base 24. The panel 22 is formed of, e.g., a resin material.

The touch panel board 23 is, e.g., a capacitive touch sensor which detects capacitance. The touch panel board 23 is adapted to detect capacitance between a sensitive surface 230 and a detection object approaching thereto/coming into contact therewith and then to output coordinate information of the detection point. In the present embodiment, since the mask rubber 21 and the sheet 20 are arranged on the sensitive surface 230, approach to/contact with the operation screen 200 of the sheet 20 is detected. The approach mentioned above means an approach to the extent that capacitance becomes more than a threshold value. Although the detection object to be detected by the touch panel board 23 is a conductive object such as a part of the body of the operator or stylus pen, operation described here is to be performed by a finger unless otherwise stated.

The touch panel 2 is not limited to the capacitive touch sensor as long as it is a sensor which can detect a tracing operation on the operation screen 200. In the present embodiment, the operating device 1 does not include a display but the operating device 1 may be configured such that the touch panel board 23 is formed of a transparent substrate and a display is provided under the touch panel board 23.

Figure 3A:
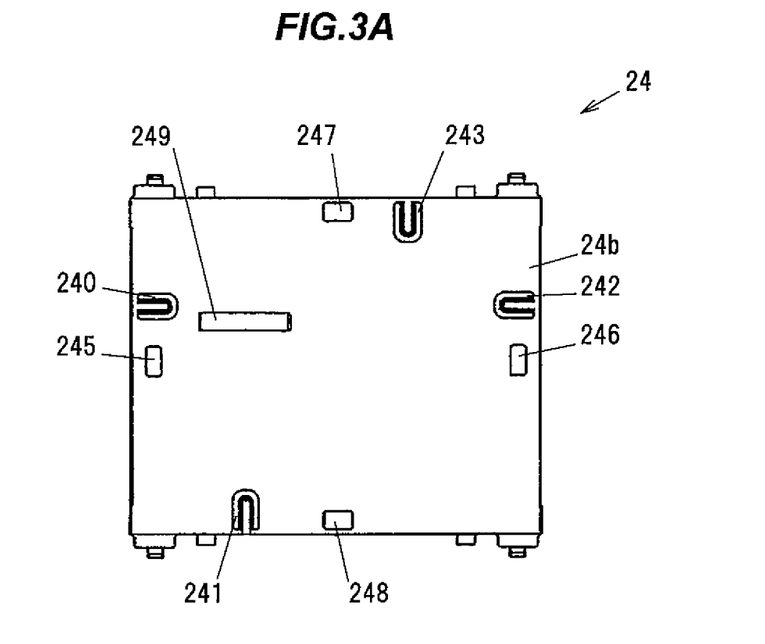
FIG. 3A is a bottom view showing a base in the embodiment and FIG. 3B is a side view thereof.
Figure 3B:
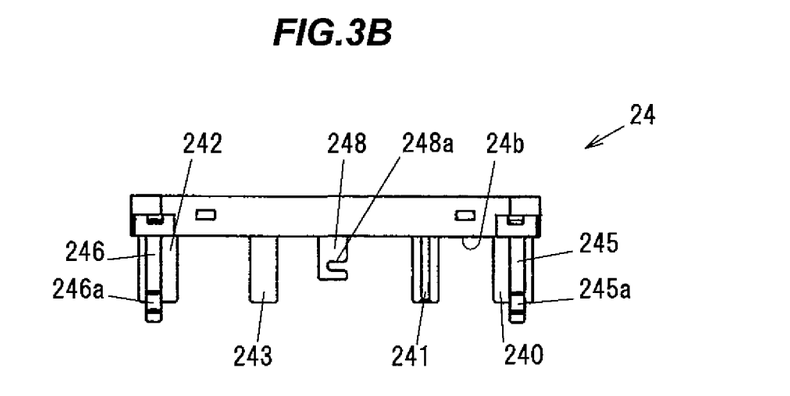

FIG. 3A is a bottom view showing a base in the embodiment and FIG. 3B is a side view thereof.

The base 24 is formed of, e.g., a resin material. The base 24 has a rectangular plate shape, as shown in FIGS. 1, 3A and 3B.

A housing portion 240a is formed on an upper surface 24a of the base 24. The touch panel board 23 is housed in the housing portion 240a.

Meanwhile, on a lower surface 24b of the base 24, legs 240 to 243 are provided in the vicinity of four sides, respectively, as shown in FIGS. 3A and 3B. The legs 240 to 243 have a U-shaped cross section. The legs 240 to 243 are inserted into through-holes formed on the below-described body 4. Thus, the legs 240 to 243 serve to guide movement of the touch panel 2.

A link 245, a link 246 facing thereto, an attachment portion 247 and an attachment portion 248 facing thereto are provided on the lower surface 24b of the base 24. The link 245 and the link 246 have a rectangular pillar shape and are longer than the legs 240 to 243. Meanwhile, the attachment portion 247 and the attachment portion 248 have a rectangular pillar shape and are shorter than the legs 240 to 243.

The link 245 has a link recess 245a into which a link pin 711 of a first gear 71 of the below-described drive mechanism unit 7 is inserted. Meanwhile, the link 246 has a link recess 246a into which a link pin 721 of a second gear 72 of the drive mechanism unit 7 is inserted.

The attachment portion 247 has a recessed portion 247a into which an end portion of the below-described stabilizer 6 is inserted. Meanwhile, the attachment portion 248 has a recessed portion 248a into which another end portion of the stabilizer 6 is inserted.

The base 24 has a through-hole 249 in the housing portion 240a. A cable 231 of the touch panel board 23 is inserted through the through-hole 249. The cable 231 is electrically connected to the control board 8.

(Configuration of Shield 12)

The shield 12 is formed of, e.g., a conductive metal material. The shield 12 has a frame shape covering the side surfaces of the touch panel 2 and is electrically connected to a ground circuit of the control board 8.

(Configuration of Depression Mechanism Unit 3)

Figure 4A:
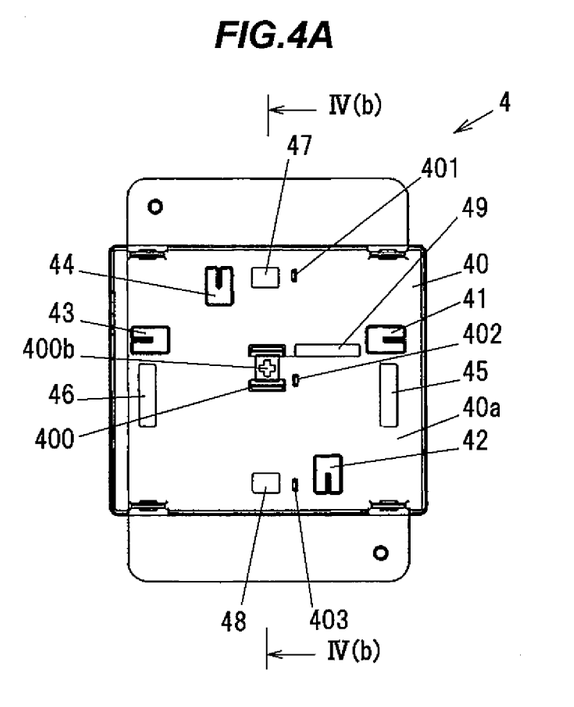
FIG. 4A is a top view showing a body in the embodiment and FIG. 4B is a cross sectional view taken on line IV(b)-IV(b) in FIG. 4A as viewed from the direction of arrow.
Figure 4B:
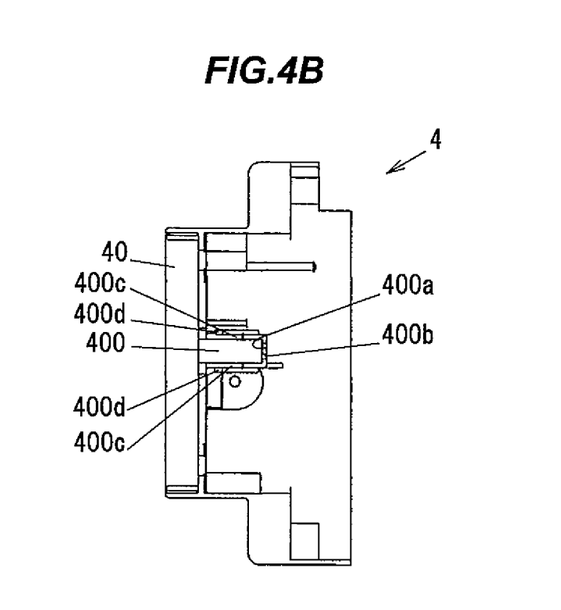

FIG. 4A is a top view showing a body in the embodiment and FIG. 4B is a cross sectional view taken on line IV(b)-IV(b) in FIG. 4A as viewed from the direction of arrow.

The depression mechanism unit 3 is generally composed of a push rod 30 as a rod coming into contact with the lower surface 24b of the touch panel 2 according to the depression operation, a body 4 as a supporting portion supporting the push rod 30, and a spring 31 as a force generator provided on the body 4 to generate a force toward the touch panel 2 and to apply the force to the push rod 30.

As shown in FIGS. 1, 4A and 4B, a housing portion 40 is provided on the top of the body 4. The touch panel 2 is housed in the housing portion 40. The body 4 is formed of, e.g., a resin material.

In addition, a rod opening 400 is formed in the middle of a bottom surface 40a of the housing portion 40. The rod opening 400 is formed in a cylindrical shape extending downwards from the bottom surface 40a, and the push rod 30 and the spring 31 are inserted thereinto.

On the bottom surface 40a, guides 41 to 44 which are through-holes are further formed in a clockwise order as viewed on the paper surface of FIG. 4A. In addition, a link hole 45, a link hole 46 facing thereto, an attachment hole 47 and an attachment hole 48 facing thereto are formed on the bottom surface 40a. Furthermore, a through-hole 49 into which a cable is inserted is formed on the bottom surface 40a between the guide 41 and the rod opening 400. The through-hole 49 is formed at a position corresponding to the through-hole 249 of the base 24 of the touch panel 2 housed in the housing portion 40.

The leg 240 of the base 24 is inserted into the guide 41. The leg 241 of the base 24 is inserted into the guide 42. The leg 242 of the base 24 is inserted into the guide 43. The leg 243 of the base 24 is inserted into the guide 44.

The link 245 is inserted into the link hole 45. Meanwhile, the link 246 is inserted into the link hole 46.

The attachment portion 247 is inserted into the attachment hole 47. The stabilizer 6 is attached to the attachment portion 247 which is inserted into the attachment hole 47. The attachment portion 248 is inserted into the attachment hole 48. The stabilizer 6 is attached to the attachment portion 248 which is inserted into the attachment hole 48. On a surface of the body 4 opposite to the bottom surface 40a, attachment portions 401 to 403 are formed in a protruding manner so as to allow the stabilizer 6 to be attached.

The attachment portion 401 supports a base portion 60 of the below-described stabilizer 6 on one end side. The attachment portion 402 supports the middle portion of the base portion 60. The attachment portion 403 supports the base portion 60 on another end side.

As shown in FIG. 4A, the rod opening 400 has a cross-shaped through-hole 400b on a bottom surface 400a. An end portion 305 of the below-described push rod 30 is inserted into the through-hole 400b.

In addition, slits 400c into which raised portions of the below-described push rod 30 are inserted are formed on side surfaces of the rod opening 400. Furthermore, stoppers 400d with which the raised portions of the push rod 30 come into contact are formed on the housing portion 40 side of the slits 400c. The stopper 400d prevents the push rod 30 from slipping out of the rod opening 400 by an elastic force of the spring 31 which is inserted into the rod opening 400.

Figure 5A:
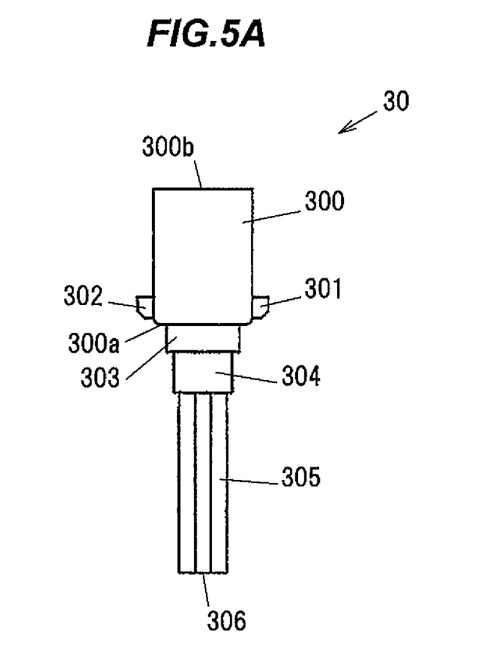
FIG. 5A is a side view showing a push rod in the embodiment and FIG. 5B is a bottom view thereof.
Figure 5B:
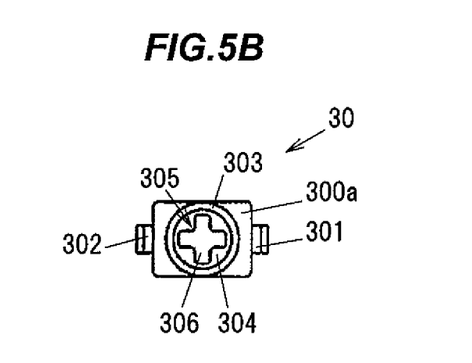

FIG. 5A is a side view showing a push rod in the embodiment and FIG. 5B is a bottom view thereof.

As shown in FIGS. 5A and 5B, the push rod 30 is generally composed of a main body 300 which is a long rectangular pillar, a column-shaped contact portion 303 protruding from an end face 300a of the main body 300, an attachment portion 304 having a columnar shape slightly smaller than the contact portion 303, and the end portion 305 protruding from an end of the attachment portion 304. The push rod 30 is formed of, e.g., a resin material.

A raised portion 301 and a raised portion 302 are formed on the main body 300 so as to protrude from both surfaces of short sides. The raised portion 301 and the raised portion 302 are inserted into the slits 400c formed on the rod opening 400 of the body 4 and serve to guide vertical movement of the touch panel 2 according to the depression operation.

An end portion of the spring 31 inserted into the rod opening 400 comes into contact with the contact portion 303. Therefore, an elastic force toward the touch panel 2 is applied to the push rod 30 from the spring 31 which is inserted into the rod opening 400. However, the push rod 30 does not slip out of the rod opening 400 since the raised portion 301 and the raised portion 302 of the push rod 30 come into contact with the stoppers 400d.

Therefore, in case that a clearance is provided between the push rod 30 and the touch panel 2, the push rod 30 is not pressed against the lower surface 24b of the base 24 of the touch panel 2 and the clearance can be maintained.

The attachment portion 304 is a portion into which the spring 31 is inserted. The end portion 305 protruding from the attachment portion 304 has a long and thin shape of which cross section in the lateral direction is a cross shape. The end portion 305 is inserted into the through-hole 400b of the rod opening 400.

The spring 31 is, e.g., a coil spring formed of a metal material. The spring 31 is not limited to metal and may be formed of a resin material etc. In addition, the force generator is not limited to the coil spring as long as it is a machine element which can causes a force toward the touch panel 2 to be applied to the push rod 30.

(Configuration of Stabilizer 6)

The stabilizer 6 as a coupling member coupling the touch panel 2 to the body 4 is provided with the base portion 60, an end portion 61 as a first end portion formed by bending an end portion of the base portion 60 and an end portion 62 as a second end portion formed by bending another end portion of the base portion 60, and is attached to the body 4 so that the base portion 60 intersects with a shaft 73 and the end portion 61 and the end portion 62 are attached to the touch panel 2.

As shown in FIG. 1, the stabilizer 6 is e.g., an elongated oval-shaped wire in which a long side is partially cut out.

The stabilizer 6 is provided so that the push switch 5 can be turned on via the push rod 30 even when an off-centered push operation is performed on the touch panel 2.

The off-centered push operation means an operation performed at a position distant from the center of the operation screen 200 of the touch panel 2. The stabilizer 6 is adapted to provide tolerance for the off-centered depression operation in the longitudinal direction thereof.

When the depression operation is performed at, e.g., a corner of the operation screen 200, a movement distance of the touch panel 2 is different at the corner and at the center and the push switch 5 may not be turned on due to the insufficient movement distance at the center. In the operating device 1, however, when an off-centered depression operation is performed at a position along the longitudinal direction of the stabilizer 6, one of the end portion 61 and the end portion 62 is twisted with respect to the base portion 60 and the other end portion follows such twist due to a force generated by the twist. The base 24 to which this other end portion is attached is pulled downward by this follow-up movement and moves downward in the state that the tilt of the touch panel 2 is corrected, and this allows the push switch 5 to be reliably turned on via the push rod 30.

(Configuration of Drive Mechanism Unit 7)

Figure 6A:
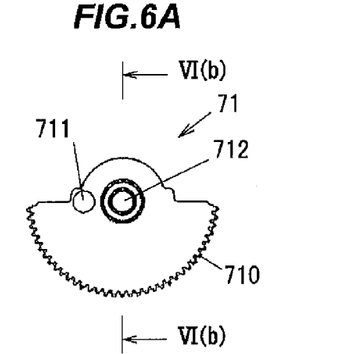
FIG. 6A is a schematic view showing a first gear of a drive mechanism unit in the embodiment.
Figure 6B:
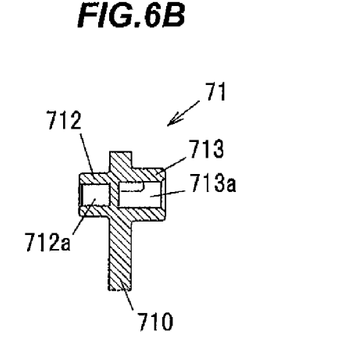
FIG. 6B is a cross sectional view taken on line VI(b)-VI(b) in FIG. 6A as viewed from the direction of arrow.
Figure 6C:
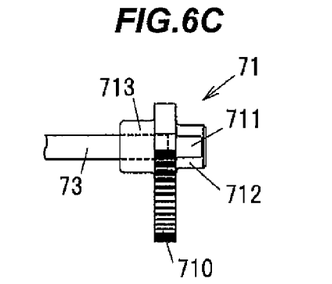
FIG. 6C is a side view showing the first gear.
Figure 6D:
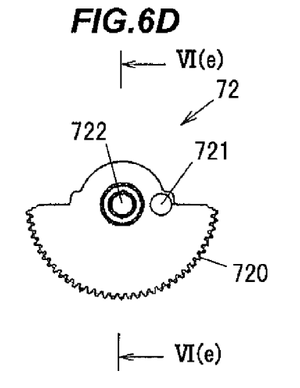
FIG. 6D is a schematic view showing a second gear.
Figure 6E:
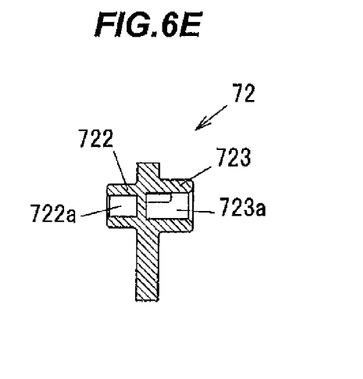
FIG. 6E is a cross sectional view taken on line VI(e)-VI(e) in FIG. 6D as viewed from the direction of arrow and FIG. 6F is a side view showing the second gear.
Figure 6F:
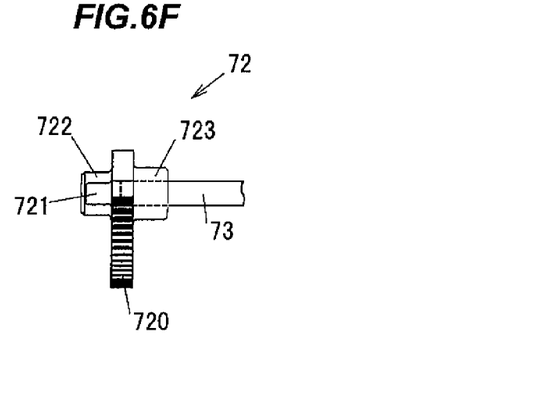

FIG. 6A is a schematic view showing a first gear of a drive mechanism unit in the embodiment, FIG. 6B is a cross sectional view taken on line VI(b)-VI(b) in FIG. 6A as viewed from the direction of arrow, FIG. 6C is a side view showing the first gear, FIG. 6D is a schematic view showing a second gear, FIG. 6E is a cross sectional view taken on line VI(e)-VI(e) in FIG. 6D as viewed from the direction of arrow and FIG. 6F is a side view showing the second gear.

As shown in FIG. 1, the drive mechanism unit 7 is generally composed of a gear shaft 70 and a motor 75. The gear shaft 70 is generally composed of the first gear 71, the second gear 72 and the shaft 73.

In detail, the drive mechanism unit 7 is provided with the motor 75 as a driving force generating portion generating a driving force, a pinion gear 76 as an output shaft-side gear provided on an output shaft of the motor 75, and the first gear 71 engaged with the pinion gear 76 and provided with the link pin 711 as a first raised portion to be coupled to the link 245 as a first link provided on the touch panel 2.

The drive mechanism unit 7 is also provided with the shaft 73 having an end portion connected to the first gear 71, and the second gear 72 as a rotating member connected to another end portion of the shaft 73 and provided with the link pin 721 as a second raised portion coupled to the link 246 as a second link which faces the link 245.

The first gear 71 and the second gear 72 are formed of, e.g., a resin material. The shaft 73 is formed of, e.g., a metal material and formed in a bar shape.

As shown in FIG. 6A, the first gear 71 is a semicircular shape and has a gear portion 710 which is formed along the circumference and is to be engaged with the pinion gear 76 provided on the output shaft of the motor 75. In addition, the first gear 71 is provided with a shaft attachment portion 713 on the shaft 73 side. As shown in FIG. 6C, the shaft attachment portion 713 has an insertion hole 713a into which the shaft 73 is inserted.

A pin insertion portion 712 is provided on the opposite side to the shaft attachment portion 713. A pin 74a shown in FIG. 1 is inserted into an insertion hole 712a of the pin insertion portion 712. The first gear 71 is rotatably attached to the body 4 by the pin 74a.

On the first gear 71, the link pin 711 is provided adjacent to the pin insertion portion 712. The link pin 711 is inserted into the link recess 245a of the link 245 of the base 24.

As shown in FIG. 6D, the second gear 72 is a semicircular shape and has a gear portion 720 formed along the circumference. In addition, the second gear 72 is provided with a shaft attachment portion 723 on the shaft 73 side. As shown in FIG. 6F, the shaft attachment portion 723 has an insertion hole 723a into which the shaft 73 is inserted. It should be noted that the second gear 72 has the same gear shape as the first gear 71 since it is preferable to have the same shape and the same mass as the first gear 71, but it is not limited thereto and the second gear 72 may have a shape on which the gear portion is not formed.

A pin insertion portion 722 is provided on the opposite side to the shaft attachment portion 723. A pin 74b shown in FIG. 1 is inserted into an insertion hole 722a of the pin insertion portion 722. The second gear 72 is rotatably attached to the body 4 by the pin 74b.

On the second gear 72, the link pin 721 is provided adjacent to the pin insertion portion 722. The link pin 721 is inserted into the link recess 246a of the link 246 of the base 24.

The motor 75 is attached to the control board 8 via a bracket 75a. The pinion gear 76 is attached to the output shaft of the motor 75. The pinion gear 76 is adapted to be engaged with the gear portion 710 of the first gear 71.

As shown in FIG. 1, the motor 75 is adapted to rotate forward and backward. Here, forward rotation is, e.g., in an arrow A direction shown in FIG. 1 and backward rotation is in an arrow B direction.

When the motor 75 rotates forward (in the arrow A direction), the pinion gear 76 rotates counterclockwise as viewed on the paper surface of FIG. 1. By this counterclockwise rotation, the first gear 71 rotates clockwise, the link pin 711 moves upward and the touch panel 2 is thus driven upward from the standard position via the link 245 of the base 24. A position after being driven upward by the maximum distance is an activation point.

Meanwhile, when the motor 75 rotates backward (in the arrow B direction), the pinion gear 76 rotates clockwise as viewed on the paper surface of FIG. 1. By this clockwise rotation, the first gear 71 rotates counterclockwise, the link pin 711 moves downward and the touch panel 2 is thus driven from above to the standard position via the link 245 of the base 24.

The drive mechanism unit 7 drives the touch panel 2 upward from the standard position, and also drives the touch panel 2, which has been driven upward, back to the standard position. Thus, the drive mechanism unit 7 is adapted not to drive the touch panel 2 downward from the standard position. In other words, tactile sensation is presented in a range from the standard position to the activation point or from the activation point to the standard position.

The movement distance from the standard position is, e.g., 0.2 to 0.05 mm. Therefore, a clearance between the touch panel 2 and the bezel 10 is, e.g., about 1 mm.

Here, the gear shaft 70 is arranged so that the longitudinal direction thereof intersects with the longitudinal direction of the stabilizer 6. This is to provide tolerance for the off-centered depression operation performed at a position along a direction intersecting with the longitudinal direction of the stabilizer 6 in contrast to the stabilizer 6 which is adapted to provide tolerance for the off-centered depression operation performed at a position along the longitudinal direction of the stabilizer 6.

When the off-centered depression operation is performed at a position along a longitudinal direction of the gear shaft 70, either the first gear 71 or the second gear 72 rotates via the link 245 or the link 246 of the base 24. When one of the gears rotates, the other gear also rotates. Thus, the base 24 is pushed down via the link into which the link pin of the other gear is inserted. Then, the touch panel 2 moves downward in the state that the tilt thereof is corrected and it is thus possible to reliably turn on the push switch 5 via the push rod 30. Therefore, the operating device 1 can provide tolerance for the off-centered depression operation by means of the stabilizer 6 and the gear shaft 70.

(Configuration of Control Board 8)

As shown in FIG. 2B, the control board 8 is a printed circuit board on which the push switch 5, a control unit 80 and a memory unit 82 are mounted.

The control unit 80 is, e.g., a microcomputer composed of a CPU (Central Processing Unit) performing calculation and processing, etc., of the acquired data according to a stored program, a RAM (Random Access Memory) and a ROM (Read Only Memory) which are semiconductor memories.

The memory unit 82 is a semiconductor memory for storing image information 820 acquired from electronic devices electrically connected to the operating device 1 and tactile pattern information 821. The memory unit 82 may be, e.g., a RAM of the control unit 80.

The image information 820 is information of, e.g., an image displayed on the display device 91.

The tactile pattern information 821 includes, e.g., information required to execute tactile sensation presentation in accordance with the below-described tactile pattern. The control unit 80 controls the drive mechanism unit 7 to provide tactile sensation based on the image information 820 and the tactile pattern information 821.

The control unit 80 is electrically connected to the push switch 5, the touch panel board 23 and the motor 75.

The push switch 5 is a push-button switch which outputs push information to the control unit 80 when the end portion thereof is pushed. This push information is information indicating that the push switch 5 is turned on. The push switch 5 is not limited to the push-button switch and may be, e.g., a load sensor sensing a load.

The touch panel board 23 is configured to output coordinate information. This coordinate information is information of coordinates of the detection object which is detected by the touch panel board 23.

The control unit 80 is configured to output drive signals for controlling the motor 75. The motor 75 rotates forward and backward based on the drive signals.

In addition, the control unit 80 is adapted to produce operation information based on the coordinate information and the push information and then to output the operation information to the connected electronic devices. This operation information is information including information of coordinates of a detection point and presence/absence of push operation, etc.

Here, the depressed distance from the standard position to the depression position is, e.g., 0.2 to 0.5 mm.

(Configuration of Cover 4a)

As shown in FIG. 1, the cover 4a is attached under the body 4. The cover 4a is formed of, e.g., a resin material, etc.

Motion of the operating device 1 in the present embodiment will be described below in reference to each drawing. Firstly, motion of the operating device 1 when providing tactile sensation according to an image displayed on the display device 91 will be described.

(Tactile Pattern)

Figure 7A:
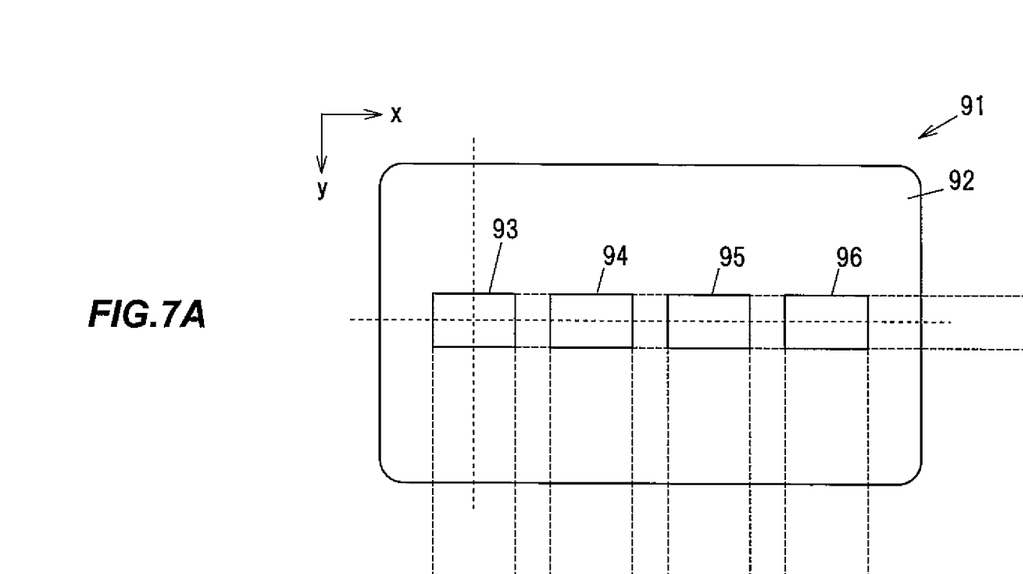
FIG. 7A is a schematic view showing an image displayed on a display device 91.
Figure 7B:
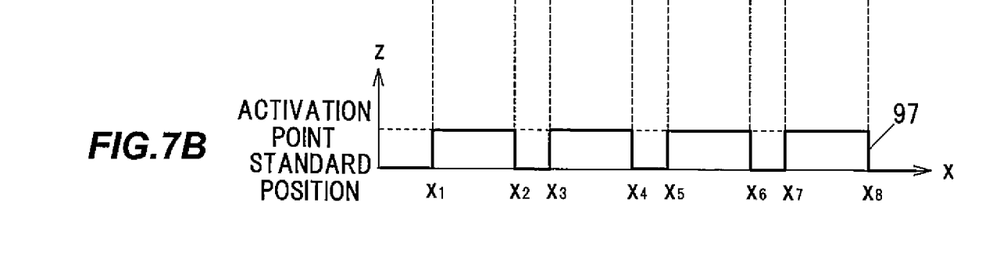
FIG. 7B is a schematic view showing a tactile pattern in the x-axis direction and FIG. 7C is a schematic view showing a tactile pattern in the y-axis direction.
Figure 7C:
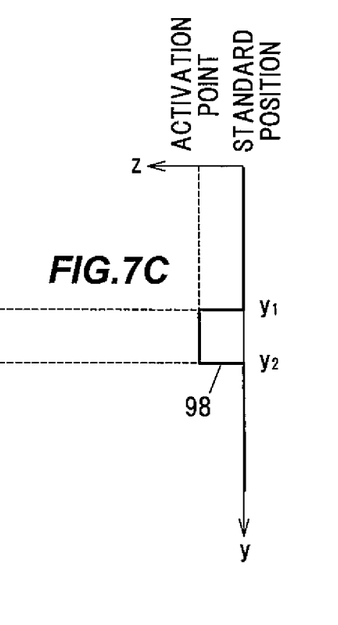

FIG. 7A is a schematic view showing an image displayed on a display device 91, FIG. 7B is a schematic view showing a tactile pattern in the x-axis direction and FIG. 7C is a schematic view showing a tactile pattern in the y-axis direction. In FIG. 7B, the vertical axis is the z-axis and the horizontal axis is the x-axis. In FIG. 7C, the vertical axis is the y-axis and the horizontal axis is the z-axis. The z-axis direction is a normal direction of the operation screen 200 of the touch panel 2.

As shown in FIG. 7A, icons 93 to 96 aligned in a line at equal intervals are displayed on a display screen 92 of the display device 91. In FIG. 7A, the origin of the x-y coordinates is located at the upper left of the display screen 92, the x-axis is positive on the right side and the y-axis is positive on the down side.

In case of an operation in which a dotted line in the x-axis direction passing through the centers of the aligned icons 93 to 96 is traced by a finger of the operator, a tactile pattern 97 is such that the touch panel 2 is driven from the standard position to the activation point at the positions corresponding to the icons 93 to 96, as shown in FIG. 7B.

The tactile pattern 97 is to drive the touch panel 2 between the point $x_1$ and the point $x_2$ which correspond to the icon 93. The tactile pattern 97 is also to drive the touch panel 2 between the point $x_3$ and the point $x_4$ which correspond to the icon 94. The tactile pattern 97 is also to drive the touch panel 2 between the point $x_5$ and the point $x_6$ which correspond to the icon 95. The tactile pattern 97 is also to drive the touch panel 2 between the point $x_7$ and the point $x_8$ which correspond to the icon 96.

When the operator performs an operation of tracing the operation screen 200 at the position corresponding to the icon 93 from, e.g., the left along the x-axis, the touch panel 2 is driven from the standard position to the activation point at the point $x_1$ and from the activation point to the standard position at the point $x_2$. Meanwhile, when the operator performs an operation of tracing the operation screen 200 at the position corresponding to the icon 93 from, e.g., the right along the x-axis, the touch panel 2 is driven from the standard position to the activation point at the point $x_2$ and from the activation point to the standard position at the point $x_1$.

The motion described above is by the operation along the x-axis. Next, the operation along the y-axis will be described.

In case of an operation in which a dotted line in the y-axis direction passing through the center of the icon 93 is traced by a finger of the operator, a tactile pattern 98 is such that the touch panel 2 is driven from the standard position to the activation point at the position corresponding to the icon 93, as shown in FIG. 7C.

The tactile pattern 98 is to drive the touch panel 2 between the point $y_1$ and the point $y_2$ which correspond to the icon 93.

When the operator performs an operation of tracing the operation screen 200 at the position corresponding to the icon 93 from, e.g., the upper side along the y-axis, the touch panel 2 is driven from the standard position to the activation point at the point $y_1$ and from the activation point to the standard position at the point $y_2$. Meanwhile, when the operator performs an operation of tracing the operation screen 200 at the position corresponding to the icon 93 from, e.g., the lower side along the y-axis, the touch panel 2 is driven from the standard position to the activation point at the point $y_2$ and from the activation point to the standard position at the point $y_1$.

Next, movement of the touch panel 2 of the operating device 1 will be described below.

(Tactile Sensation Presentation)

Figure 8:
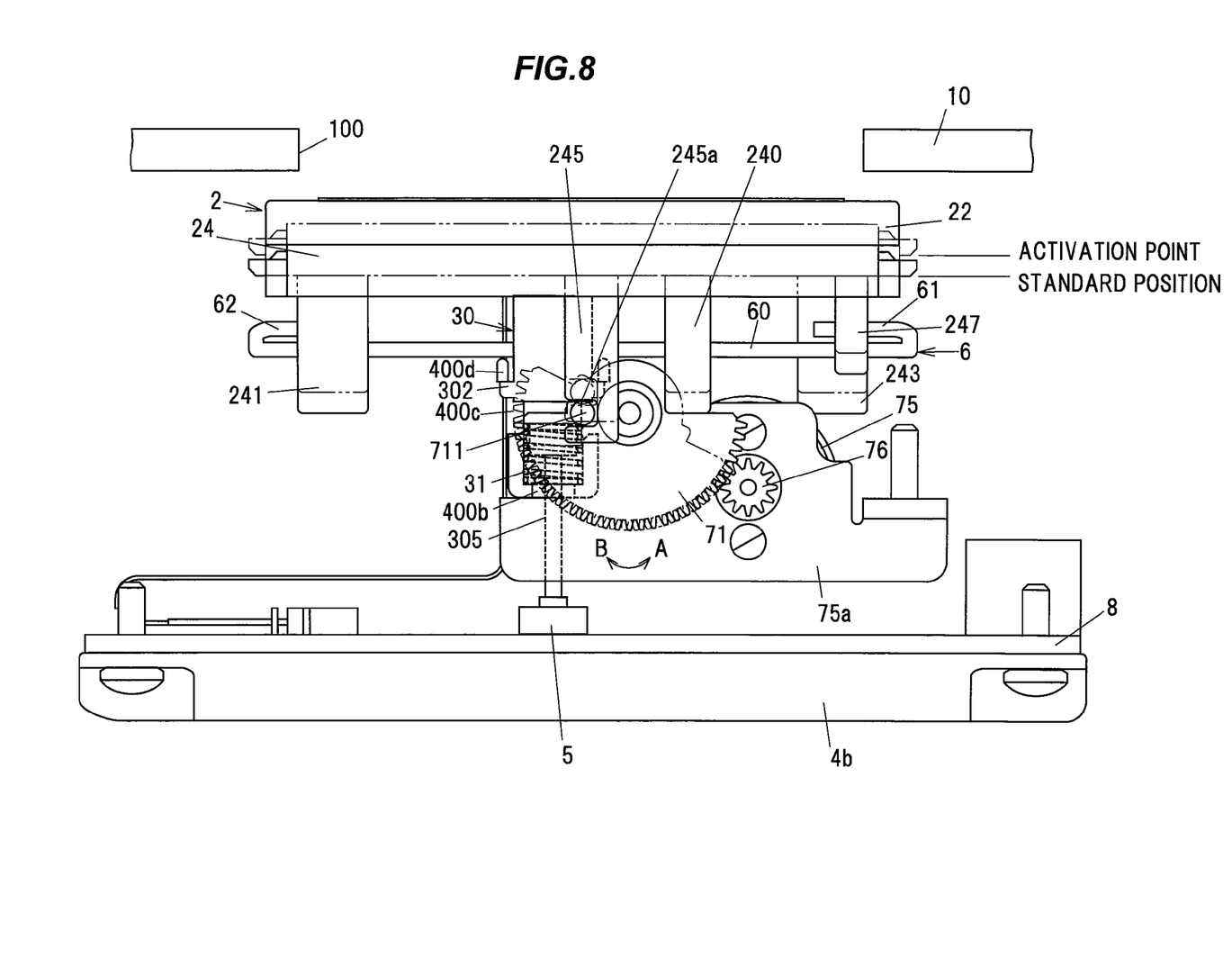
FIG. 8 is a schematic view showing movement from the standard position in the operating device in the embodiment.

FIG. 8 is a schematic view showing movement from the standard position in the operating device in the embodiment. In FIG. 8, a solid line shows the operating device 1 located at the standard position and a chain double-dashed line shows the operating device 1 located at the activation point. The movement by the operation of tracing the icon 93 from the left side will be described.

When the position of the detection point is determined as $x_1$ based on the coordinate information output from the touch panel 2, the image information 820 stored in the memory unit 82 and the tactile pattern information 821, the control unit 80 outputs a drive signal for driving the motor 75.

The motor 75 rotates forward (in the arrow A direction) based on the drive signal. Along with this rotation, the pinion gear 76 rotates counterclockwise as viewed on the paper surface of FIG. 8 and, at the same time, the first gear 71 rotates clockwise.

Due to this rotation of the first gear 71, the link pin 711 of the first gear 71 moves the touch panel 2 upward via the link 245 of the base 24 and, at the same time, the second gear 72 rotates via the shaft 73 and the link pin 721 of the second gear 72 moves the touch panel 2 upward via the link 246 of the base 24.

The control unit 80 outputs a control signal until the touch panel 2 is driven to the activation point.

Next, the movement from the activation point to the standard position will be described.

When the position of the detection point is determined as $x_2$ based on the coordinate information output from the touch panel 2, the image information 820 stored in the memory unit 82 and the tactile pattern information 821, the control unit 80 outputs a drive signal for driving the motor 75.

The motor 75 rotates backward (in the arrow B direction) based on the drive signal. Along with this rotation, the pinion gear 76 rotates clockwise as viewed on the paper surface of FIG. 8 and, at the same time, the first gear 71 rotates counterclockwise.

Due to this rotation of the first gear 71, the link pin 711 of the first gear 71 moves the touch panel 2 downward via the link 245 of the base 24 and, at the same time, the second gear 72 rotates via the shaft 73 and the link pin 721 of the second gear 72 moves the touch panel 2 downward via the link 246 of the base 24.

The control unit 80 outputs a control signal until the touch panel 2 is driven to the standard position.

Next, the depression operation of the touch panel 2 will be described below.

(Depression Operation)

Figure 9:
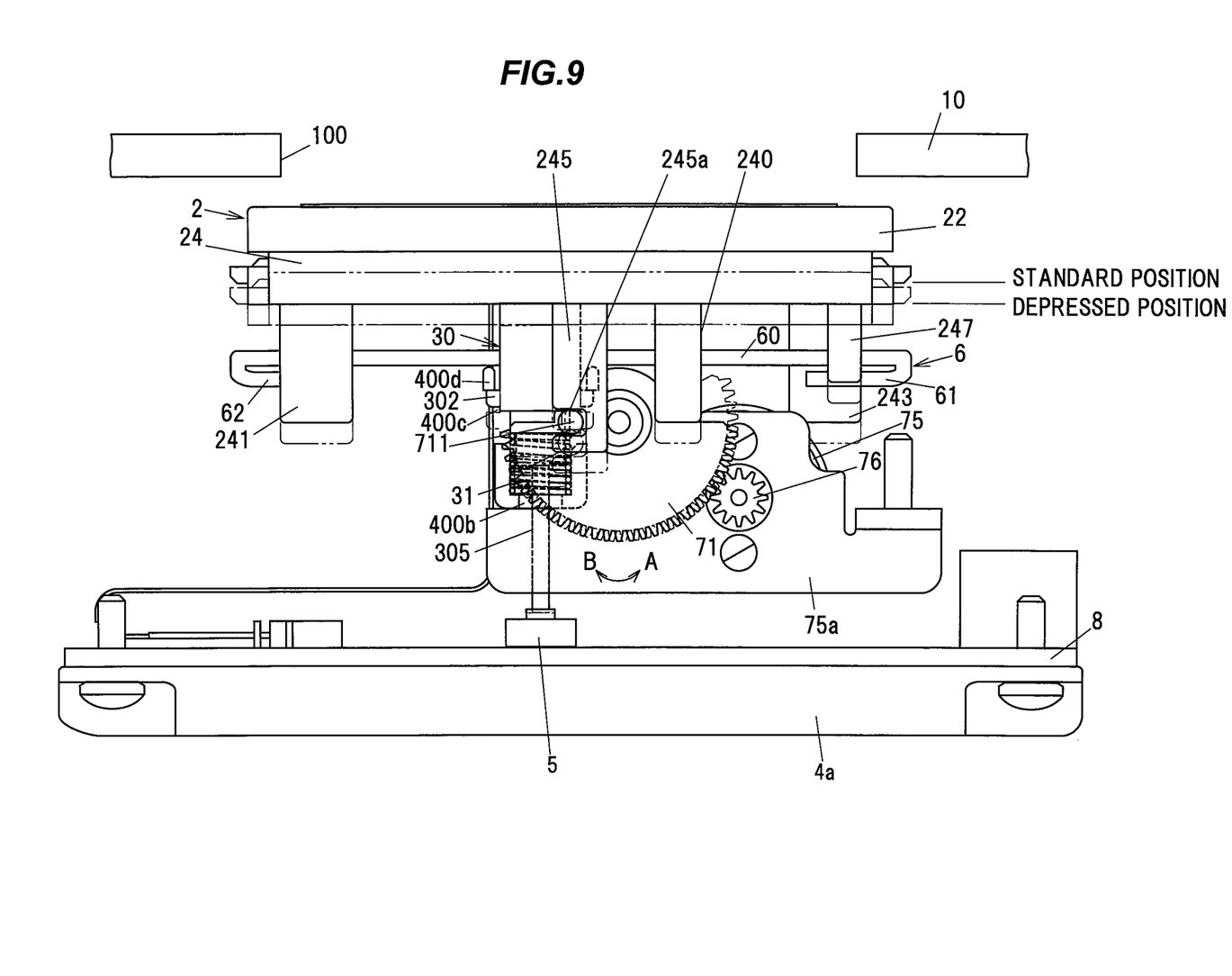
FIG. 9 is a schematic view showing motion from the standard position by a depression operation in the operating device in the embodiment.

FIG. 9 is a schematic view showing motion from the standard position by a depression operation in the operating device in the embodiment.

For example, the operator depresses the operation screen 200 downward in a state that a finger is located on the operation screen 200 at the position corresponding to the icon 93.

Due to this depression operation, the touch panel 2 is pushed down, the lower surface 24b of the touch panel 2 comes into contact with an end face 300b of the push rod 30 and the push rod 30 moves to the lower side as viewed on the paper surface of FIG. 9.

The push rod 30 moves downward while the raised portions 301 and 302 are being guided by the slits 400c of the rod opening 400. In accordance with this movement, a tip end surface 306 of the push rod 30 comes into contact with and pushes down the end portion of the push switch 5.

The push switch 5 is turned on by depression performed on the end portion thereof and then outputs push information.

When the operator finishes the depression operation and takes the finger off the operation screen 200, an accumulated elastic force of the spring 31 is released and pushes the push rod 30 upward as viewed on the paper surface of FIG. 9. The push rod 30 moves upward and, at the same time, the touch panel 2 in contact with the push rod 30 moves from the depression position to the standard position.

Upward movement of the push rod 30 is restricted by the stoppers 400d, as shown in FIG. 9. Thus, movement of the touch panel 2 is up to the standard position.

The control unit 80 produces operation information based on the push operation acquired from the push switch 5 and the coordinate information acquired from the touch panel board 23 and then outputs the operation information to the electronic device.

The electronic device determines, based on the operation information, that the icon 93 is selected and set, and then performs the function allocated to the icon 93.

Effects of the Embodiment

The operating device 1 in the present embodiment can provide tactile sensation and can detect the depression operation without requiring a sophisticated control. In the operating device 1, tactile sensation is presented by driving the touch panel 2 upward from the standard position and the depression operation is performed by pressing the touch panel 2 downward from the standard position. Since the push rod 30 does not push down the push switch 5 at the time of providing tactile sensation, the operating device 1 can provide tactile sensation and can detect the depression operation by a simple control. Therefore, a control unit having sophisticated processing ability is not required for the operating device 1, hence, low in cost.

The operating device 1 can present tactile sensation by using the motor 75 and thus can provide stronger vibration to the finger than tactile sensation presentation using a piezoelectric element.

Since the operating device 1 is provided with the stabilizer 6 and the gear shaft 70, the push switch 5 can be turned on even by an operation of depressing a corner of the touch panel 2. In addition, it is not necessary to arrange two stabilizers in the operating device 1, hence, low in cost.

Since the operating device 1 can provide tactile sensation based on the image information 820 of an image displayed on the display device 91, the operator can know the positions of icons, etc., without looking on the operation screen 200.

Although some embodiments of the invention have been described, these embodiments are merely an example and the invention according to claims is not to be limited thereto. New embodiments and modifications thereof may be implemented in various other forms, and various omissions, substitutions and changes, etc., can be made without departing from the gist of the invention. In addition, all combinations of the features described in these embodiments are not necessary to solve the problem of the invention. Further, these embodiments are included within the scope and gist of the invention and also within the invention described in the claims and the range of equivalency.

INDUSTRIAL APPLICABILITY

The invention is applicable to an operating device providing tactile sensation by vibration, in which the vibration may be applied to a load sensing portion via a touch sensor and may be misdetected as a load of push operation even though push operation is not performed.

REFERENCE SIGNS LIST

1: operating device
2: touch panel
3: depression mechanism unit
4: body
4a: cover
5: push switch
6: stabilizer
7: drive mechanism unit
8: control board
9: vehicle
10: bezel
12: shield
20: sheet
21: mask rubber
22: panel
23: touch panel board
24: base
24a: upper surface
24b: lower surface
30: push rod
31: spring
40: housing portion
40a: bottom surface
41 to 44: guide
45, 46: link hole
47, 48: attachment hole
49: through-hole
60: base portion
61, 62: end portion
70: gear shaft
71: first gear
72: second gear
73: shaft
74a: pin
74b: pin
75: motor
75a: bracket
76: pinion gear
80: control unit
82: memory unit
90: center console
91: display device
92: display screen
93 to 96: icon 97, 98: tactile pattern
100: opening
101 to 104: leg
200: operation screen
210: recessed portion
211: bottom surface
230: sensitive surface
231: cable
240 to 243: leg
240a: housing portion
245, 246: link
245a, 246a: link recess
247, 248: attachment portion
247a, 248a: recessed portion
249: through-hole
300: main body
300a, 300b: end face
301, 302: raised portion
303: contact portion
304: attachment portion
305: end portion
306: tip end surface
400: rod opening
400a: bottom surface
400b: through-hole
400c: slit
400d: stopper
401 to 403: attachment portion
710: gear portion
711: link pin
712: pin insertion portion
712a: insertion hole
713: shaft attachment portion
713a: insertion hole
720: gear portion
721: link pin
722: pin insertion portion
722a: insertion hole
723: shaft attachment portion
723a: insertion hole
820: image information
821: tactile pattern information

The invention claimed is:

1. An operating device, comprising:
a detecting portion to detect an operation of tracing on an operation screen by a user;
a depression mechanism unit to allow a depression operation in a direction downward from a standard position of the detecting portion;
a depression detecting portion to detect the depression operation via the depression mechanism unit; and
a drive mechanism unit to allow driving of the detecting portion between the standard position of the detecting portion and a upward position therefrom, wherein the drive mechanism unit comprises a driving force generating portion to generate a driving force, an output shaft-side gear provided on an output shaft of the driving force generating portion, and a first gear engages with the output shaft-side gear and comprising a first raised portion to be coupled to a first link provided on the detecting portion.

2. The operating device according to claim 1, further comprising a control unit that controls the drive mechanism unit so as to drive the detecting portion based on an image information of an image displayed on a display device.

3. The operating device according to claim 1, wherein the depression mechanism unit comprises a rod to contact with a lower surface of the detecting portion by the depression operation, a supporting portion to support the rod and comprising a link hole into which the first link is inserted, and a force generator provided on the supporting portion so as to generate a force toward the detecting portion and to apply the force to the rod.

4. The operating device according to claim 3, wherein the drive mechanism unit comprises a shaft with an end portion connected to the first gear, and a rotating member connected to another end portion of the shaft and provided with a second raised portion coupled to a second link that faces the first link.

5. The operating device according to claim 4, wherein a coupling member coupling the detecting portion to the supporting portion comprises a base portion, a first end portion fanned by bending an end portion of the base portion and a second end portion formed by bending another end portion of the base portion, and is attached to the supporting portion so that the base intersects with the shaft and the first and second end portions are attached to the detecting portion.

6. The operating device according to claim 1, wherein the depression mechanism comprises a supporting portion comprising a link hole into which the first link is inserted.

* * * * *